Patented Oct. 18, 1927.

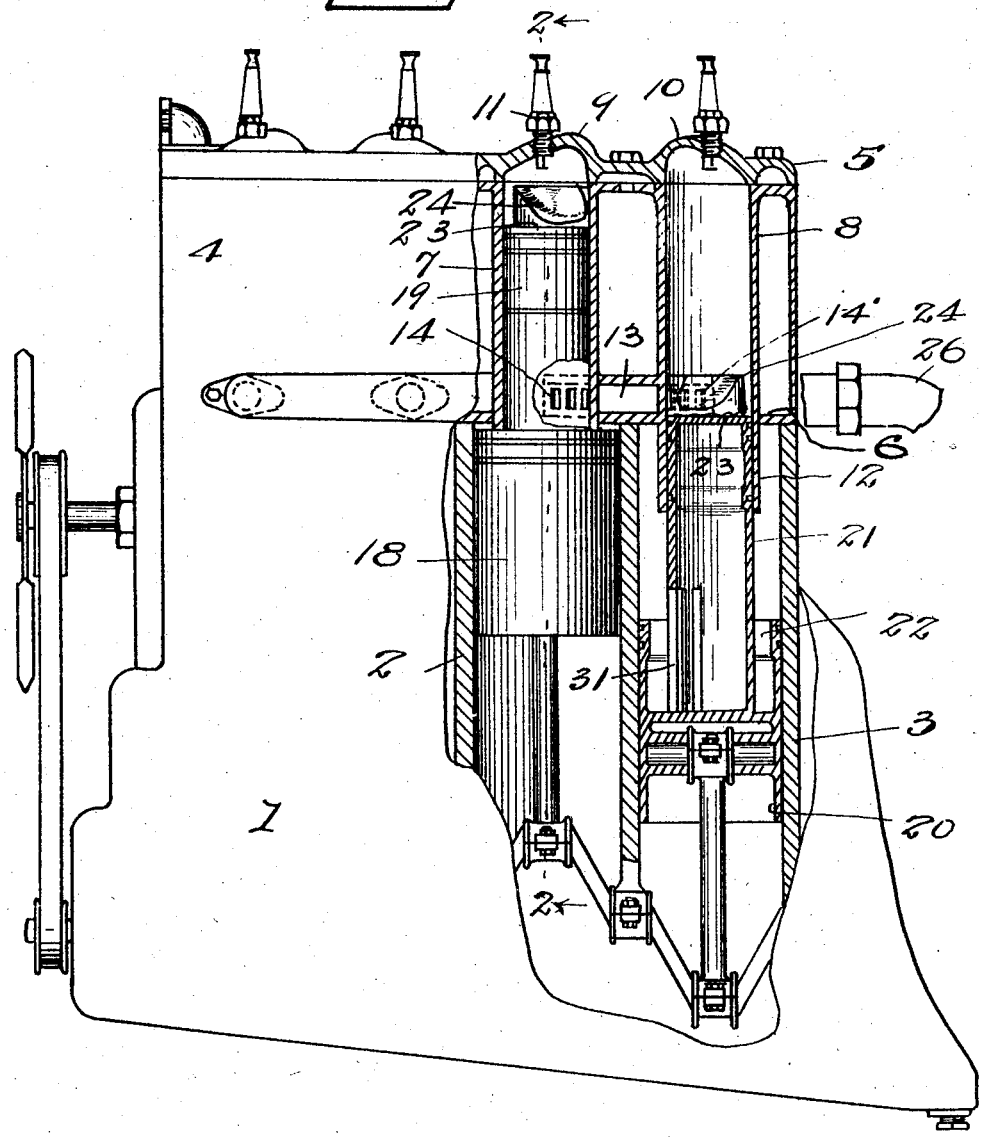

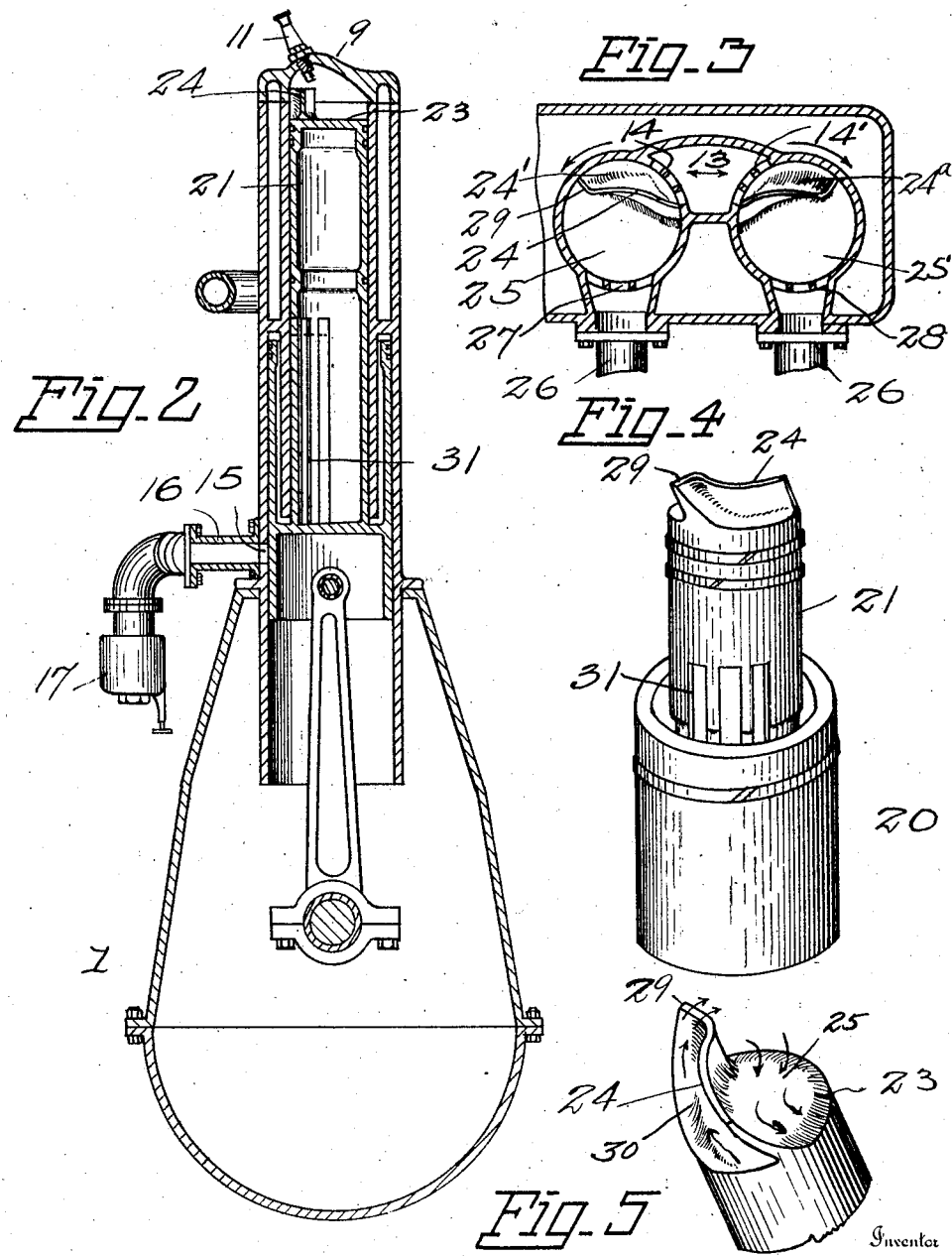

1,645,647

UNITED STATES PATENT OFFICE.

THOMAS A. HUTSELL, OF SPOKANE, WASHINGTON, ASSIGNOR TO HUTSELL MOTOR COMPANY, OF SPOKANE, WASHINGTON.

INTERNAL-COMBUSTION ENGINE.

Application filed August 29, 1923. Serial No. 659,989.

My present invention relates to improvements in internal combustion engines and particularly to the construction of the piston and cylinder construction therein. The primary object of the invention is to so construct the head of the piston and the complementary head of its cylinder in such manner that the fresh fuel charge and the gases of combustion in the cylinder will be controlled whereby an economical and efficient engine is insured; a maximum compression of the fuel in the cylinder is provided for with a maximum development of power and with an expenditure of a minimum quantity of fuel.

The invention embodies several novel features of construction in the piston head and its cylinder head, and novel combinations and arrangements of parts whereby the cylinder walls are maintained in a relatively cool condition and at a uniform temperature in order that the piston may work with a more accurate and close fit in the cylinder thus preventing leakage or waste of gas past the piston rings. The cylinder head however is not cooled by the use of water jacket and is maintained in a uniformly heated condition to heat the fuel charge. By the construction and arrangement of the piston head and its adjoining cylinder head means are provided whereby the fresh fuel charge is introduced into the cylinder with a swirling motion or current; the fuel gas and the gases of combustion in the cylinder are stratified with the exhaust gas beneath the fuel gas, and the swirling current of fresh gas is instrumental in assisting in the discharge of the exhaust or spent gases of combustion from the cylinder.

While my invention is applicable for use in connection with all standard types of internal combustion engines, I prefer to illustrate it in connection with that type of engine embodying a two cycle operation in which the pump and motor cylinders and complementary pistons have differential areas. As here illustrated the pistons are of the tandem form and the cylinders are arranged in pairs with a tubular connection between working or motor cylinders of each pair whereby one cylinder and piston form a pump for compressing and supplying a fresh fuel charge to the adjacent motor cylinder of the engine.

In the accompanying drawings I have illustrated one complete example of the physical embodiment of my invention as above indicated, wherein the parts are combined and arranged in accord with the best mode I have thus far devised for the practical application of the principles of my invention.

Figure 1 is a view of an internal combustion engine with a pair of adjacent parallel communicating cylinders in section disclosing one of the tandem pistons also in section.

Figure 2 is an enlarged transverse vertical sectional view at line 2—2 of Figure 1.

Figure 3 is an enlarged horizontal sectional detail view showing the relation of the pistons and intake and exhaust openings.

Figure 4 is a perspective view of one of the tandem pistons of which the head of the working or motor piston is equipped according to my invention.

Figure 5 is a diagrammatic view in perspective of a piston head and showing by arrows the swirling movement of the fuel gas and exhaust gases in the upper end of a motor cylinder.

In the drawings a four cylinder type of engine is exemplified, but it will be understood that my invention may be embodied in any of the standard types of internal combustion engines for which its use is adapted.

In order that the construction and operation and relative arrangement of parts of the engine illustrated may be evident, a short description of the engine will be given.

The engine base 1 is fashioned with a pair of pump or compression cylinders 2 and 3 arranged in parallelism and upon the engine base the top section 4 of the engine is secured. This top section or engine bloc is provided with a water jacket 5 and is fashioned with a lower horizontal flange 6 extending over and forming heads to close the two parallel cylinders 2 and 3.

The two adjacent motor cylinders 7 and 8 are alined co-axially with their pump cylinders 2 and 3 respectively, and the closed heads 9 and 10 of these working or motor cylinders are provided with the usual ignition devices or spark plugs 11. The complementary co-axial cylinders have differential areas and the motor cylinders are each formed with a depending annular flange or extension 12 which projects into the open pump cylinder.

As best shown in Figures 1 and 2 a tubular connection 13 is located between the two walls of the motor cylinders for passage of gases from one cylinder to another, by means of which the fresh fuel charge is transferred from one pump or compression cylinder to an adjacent motor cylinder as will be described. At its ends this tubular connection has ports 14 and 14′ in the walls of the motor cylinders as best seen in Figs. 1 and 3. In Fig. 2 an intake port for the fuel gas is indicated at 15 in the wall of a pump cylinder, and the pipe 16 leading thereto is shown connected with a carbureting device as 17.

The tandem pistons each includes a pump piston 18 and a motor piston 19, and 20 and 21 designate the duplicate pistons of a section of the engine adapted to reciprocate in their respective cylinders. A compression chamber 22 is formed in each pump piston and the upper closed head 23 of each motor piston is fashioned with an integral baffle wall 24 of special formation. As seen in Figs. 3, 4, and 5 this wall rises above the top of the head 23 and extends diagonally across the head, but offset from the axial center of the piston, and the baffle wall of each of these piston heads forms a compartment as 24′ and 24ª in the respective cylinders above the piston heads. These compartments are adapted to be placed in communication through the ports 14, 14′ and the passage 13 between the motor cylinders. At the opposite sides of the baffle walls of the piston heads comparatively larger compartments 25 and 25′ are formed in the motor cylinders above the piston heads, and these compartments communicate with the exhaust manifold 26 through the respective ports 27 and 28 in the walls of the motor cylinders 7 and 8.

The chambers or compartments 24′ and 24ª form intake chambers for a fresh fuel charge and the chambers formed at 25 and 25′ form outlet chambers for the gases of combustion from a previous explosion in the engine cylinder. These chambers are of peculiar formation attained by a special construction of the piston head and the baffle wall 24. The chamber 24′ it will be noted (as is also the case with the chamber 24ª) is an annular space extending partially around the piston head and thereabove and of which the wall of the cylinder forms the outer wall. The inner wall of this space is formed by the baffle wall 24 and a radially disposed extension 29 of this baffle wall which terminates at the cylinder wall. The lower or bottom wall of this annular space is formed by an inclined surface 30 of the piston head which terminates at its highest point at the radially disposed extension 29 of the baffle wall. The top of the baffle wall from end to end is level, and as seen in Fig. 3 its ends terminate at the wall of the motor cylinder at opposite sides of the ports in the cylinder walls.

A complementary construction is provided in the interior of the cylinder heads designated 9, which construction conforms to the shape of the piston heads and their baffle walls, and a smooth inner surface is provided for the dome shaped cylinder heads. It will be noted that the exterior water jacket is omitted from the heads 9 and therefore these cylinder heads which are not cooled, are heated from the combustion of gases. The smooth heated faces at the interior of the heads are uniformly heated over their entire areas, and the absence of any projecting parts on the smooth surfaces eliminates the possibility of any "hot spots" that would otherwise develop within the cylinder head and result in premature ignition.

When the engine is operating and the pump piston as 3 rises it will compress a fuel charge that has entered through port 15 to the pump cylinder 3. The pump piston is provided with vertically extending elongated ports 31 in its wall, and it will be apparent that the fuel charge is forced from the pump cylinder into this pump piston. Before the upwardly moving piston reaches the end of its stroke the upper ends of the elongated ports 31 register with the complementary ports 14′ of the motor cylinder. The charge under compression is transferred from the pump piston through ports 14′ passage 13 and ports 14 into the motor cylinder 7 above the motor piston 19, resulting in the swirling movement of the fuel charge before described.

The incoming fuel charge as it strikes the baffle wall is caused to pass around back of the wall and in close contact with the curved cylinder wall and at the same time the fuel charge is directed upwardly by the formation of the inclined face of the piston head, thus preventing close or intimate relation of the fuel charge to the spent gases of combustion. Through the swirling motion of the fuel charge the latter acts as a scavenger to force out the spent gas which are exhausting at the instant that the intake ports are opened to the pump piston. The swirling movement of the fuel charge as it is being compressed by the up stroke of the piston also insures a more thorough mixture.

When the piston has reached the proper point in its compression stroke the spark from the plug 11 will fire the charge. As the charge is fired a broad and expansive flame is forced over the baffle wall which insures ignition over the entire area of the cylinder and consequent powerful explosion of the charge.

On the opposite side of the baffle wall the exhaust gases are deflected downwardly and the fuel charge therefore will form a gaseous envelope or stratum over the outgoing exhaust gas with a tendency to assist its departure. The cooled cylinder walls prevent excessive heating of the fuel while it is being compressed, but when the fuel gas contacts with the heated cylinder head the heated gas is expanded, thus permitting a maximum charge of fuel in the cylinder which cannot be expanded before it is thoroughly compressed, and resulting in a greater explosive power when the charge is ignited.

Having thus fully described my invention, what I claim as new and desire to secure by Letters Patent is—

The combination with a pair of working cylinders each having oppositely disposed inlet and exhaust ports and a directly communicating passage between the respective inlet ports, of a working piston in each cylinder having an approximately transversely disposed arcuate baffle wall terminating in a radial end and adapted to separate the space between the inlet ports when the pistons are at lowermost position, and an upwardly inclined arcuate surface on each piston exterior of the baffle wall, terminating at the radial portion of the baffle wall whereby an incoming stream is given an upward swirling motion in each cylinder.

In testimony whereof I affix my signature.

THOMAS A. HUTSELL.